Figure 1:
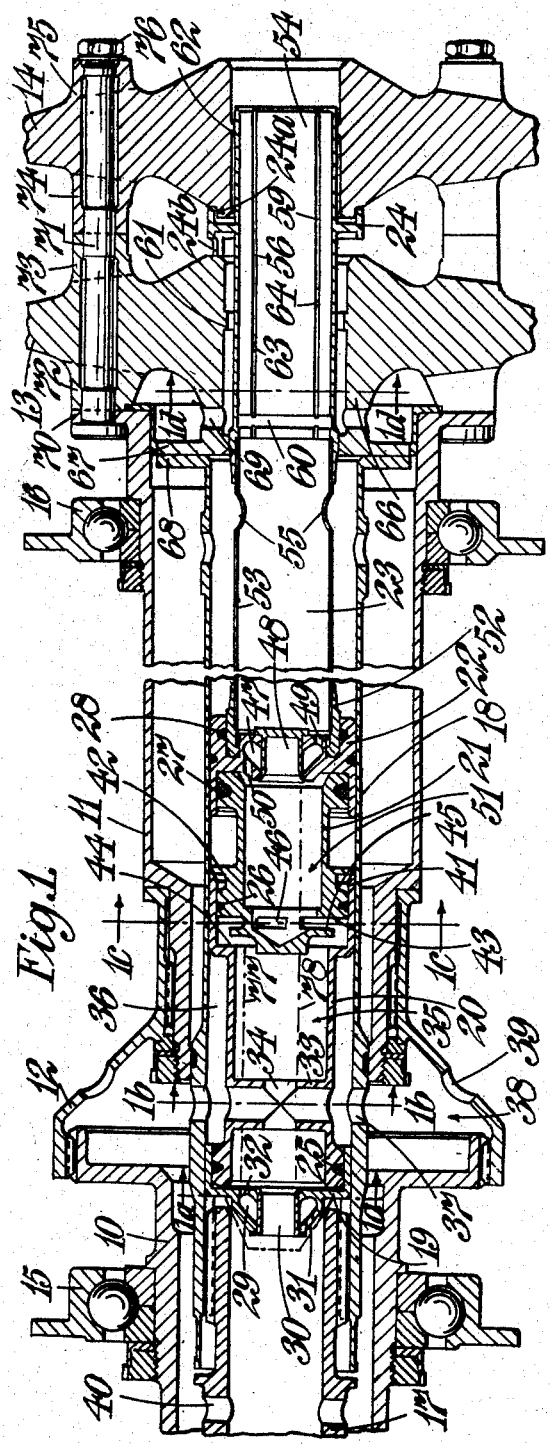

Jan. 27, 1959  L. HAWORTH ET AL  2,870,870
LUBRICATING ARRANGEMENTS FOR ROTATING MACHINERY
Filed Oct. 1, 1956  2 Sheets-Sheet 2

United States Patent Office 2,870,870
Patented Jan. 27, 1959

2,870,870

LUBRICATING ARRANGEMENTS FOR ROTATING MACHINERY

Lionel Haworth, Littleover, Ralph John Shire, Normanton, and Frederick Moss, Derby, England, assignors to Rolls-Royce Limited, Derby, England, a British company Application October 1, 1956, Serial No. 613,147

Claims priority, application Great Britain October 26, 1955

17 Claims. (Cl. 184—6)

This invention relates to lubricating arrangements for rotating machine and is especially suitable for use in connection with gas-turbine engines.

In certain cases rotating machinery requires a supply of lubricant immediately on starting to rotate; for example lubricant may, when the machinery is not in use, drain away from the bearings or other parts which require lubrication, and accordingly it is one object of this invention to provide a supply of lubricant immediately the machinery starts to rotate.

According to this invention, in rotating machinery, means for supplying lubricant to the bearings or other parts requiring lubrication comprises a rotating part through which lubricant passes in operation of the machinery and which affords within it the chamber located symmetrically with respect to the axis of rotation and adapted to trap a quantity of the lubricant when the machinery ceases to rotate, and means adapted to deliver the trapped lubricant from the chamber to the parts requiring lubrication when the machinery again starts to rotate.

In one construction of this invention, the means to deliver the trapped lubricant comprises a passage in an end wall of the chamber, the ends of the passage being spaced at opposite sides of the axis of rotation of the part so that, in whatever position the parts stop rotating, a quantity of lubricant is trapped in the chamber, and the passage having one end communicating with the chamber adjacent its periphery and having the other end communicating with the part to be lubricated, so that when the part starts to rotate lubricant is caused to pass through the passage, owing to centrifugal effect, to the part to be lubricated.

In another construction of this invention, the rotating part comprises a pair of chambers which are both symmetrical about the axis of rotation and are arranged end to end, whereof the first chamber has an inlet to receive a lubricant mist and comprises centrifugal separator means whereby the lubricant is trapped within the chamber and the air is allowed to escape through an air outlet nearer the axis of rotation, and whereof the second chamber is provided with an outlet passage of which the ends lie on opposite sides of the axis of rotation, and the two chambers are separated by a centrifugal seal which during rotation of the part fills with oil owing to centrifugal effect and prevents communication between the chamber.

Figure 2:
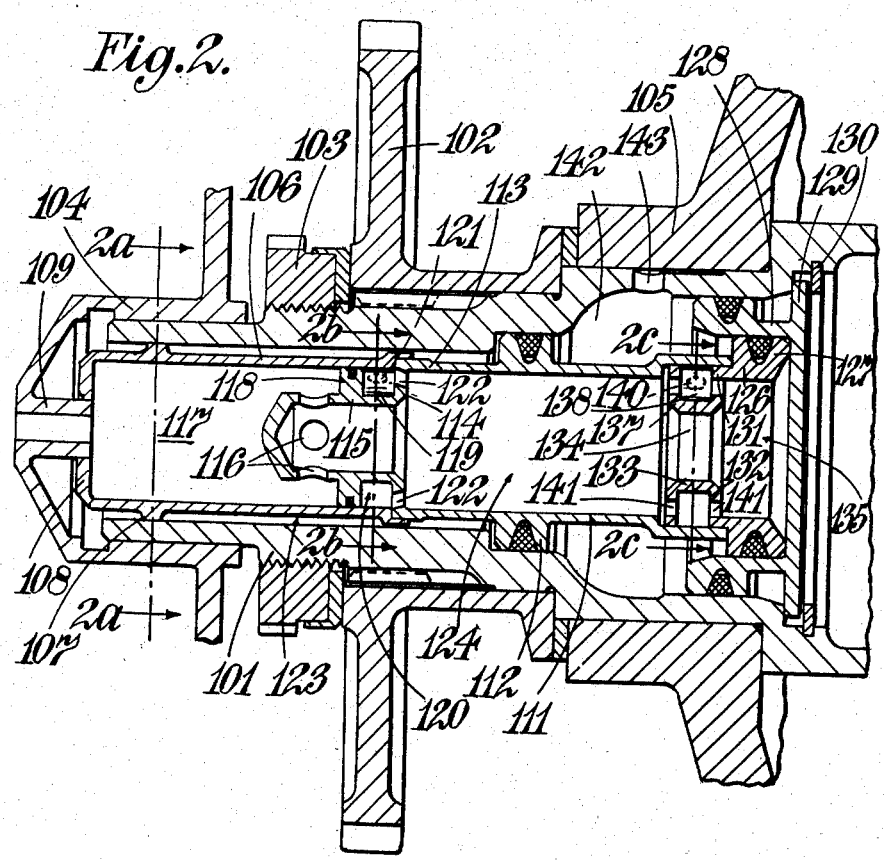
Figure 2A:
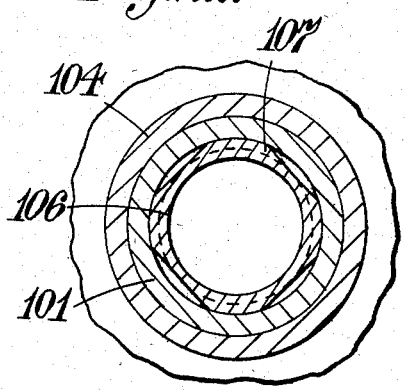
Figure 2B:
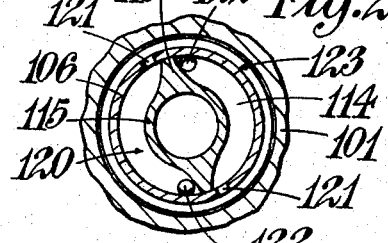
Figure 2C:

Two embodiments of this invention will now be described by way of example with reference to the accompanying drawings, in which:

Figure 1 shows a first embodiment in axial section,
Figure 1a shows a view on the arrow 1a in Figure 1,
Figure 1b shows a section on the line 1b—1b in Figure 1,
Figure 1c shows a section on the line 1c—1c in Figure 1,
Figure 1d shows a section on the line 1d—1d in Figure 1,
Figure 2 shows a second embodiment of the invention in axial section,
Figure 2a shows a section on the line 2a—2a in Figure 2,
Figure 2b shows a section on the line 2b—2b in Figure 2, and
Figure 2c shows a section on the line 2c—2c in Figure 2.

Referring to Figure 1 there is shown a shaft arrangement of a gas-turbine engine comprising a first shaft 10, a second shaft 11 drivingly connected to the first shaft 10 by means of a coupling member 12, and a pair of turbine discs 13, 14 bolted to a flange on the end of shaft 11. Shafts 10 and 11 are supported in bearings 15, 16. In order to prevent corrosion of the turbine discs in operation, it has been found desirable to supply a metered quantity of lubricant to the front and rear faces of the discs 13, 14 when the engine begins to rotate.

Within shaft 10 there is a hollow shaft 17 to which an air/oil mist is supplied from its left-hand end (as seen in the drawing) and this shaft is in splined engagement with a second hollow shaft 18 which lies mainly within shaft 11 and which is coaxial with shaft 11.

Within the shaft 18 there is provided an oil trap which comprises a cup-shaped transverse wall member 19 which abuts against the end of the splines within shaft 18. Received within the cup-shaped member 19 is a waisted cylindrical tubular member 20 which extends lengthwise of the shaft axis and fits within the shaft 18 at its other end. The latter end of the tubular member 20 receives within it a further tubular member 21 which at its other end fits within a second cup-shaped transverse wall member 22, which also fits within the shaft 18. Received in an annular recess in the transverse wall member 22 on the side remote from the tubular member 21 is an elongated sleeve 23, the other end of which is formed with a circumferential flange 24 which is trapped between the downstream face of the high-pressure disc 13 and the upstream face of the second-stage turbine disc 14, so that the parts 19, 20, 21, 22 and 23 are held against substantial axial displacement. A small axial clearance is provided between flange 24 and disc 14 to permit relative axial expansion, and disc 14 is also scalloped at circumferentially-spaced points as shown at 24a. Moreover on its upstream side the flange 24 has two circumferentially-extending slots cut in it to leave circumferentially short lands 24b abutting disc 13.

The tubular member 20 is provided with a circumferential groove around its end which fits within the cup-shaped transverse end wall 19, and the groove contains a rubber sealing ring 25, and similar grooves containing sealing rings 26, 27, 28 are formed respectively in the ends of the tubular member 21 where it fits within the end portion of the tubular member 20 and within the second cup-shaped end wall 22, and around the circumferential groove in the transverse wall member 22, within which the sleeve 23 fits.

The cup-shaped member 19 is formed with a central aperture co-axial with the axis of rotation of the shaft and this aperture is formed with a substantially semicircular passage 29 around its periphery which is closed by an eyelet 30 extending through the aperture. The passage 29 is formed with drilled holes 31, 32 at opposite ends of a diameter, opening respectively to each side of the cup-shaped member 19.

The tubular member 20 is formed between its ends with a smaller-diameter tubular portion 33 extending transversely to its axis; the smaller-diameter tubular portion is formed with drilled holes 34 co-axial with the axis of rotation which open to within the chamber 35 formed within the tubular member 20, and the smaller-diameter tubular portion 33 opens at each end into a space 36 formed between the waisted part of the outer diameter of the tubular member 20 and the bore of the shaft 18.

The shaft 18 is formed with apertures 37, in the plane of the ends of the tubular portion 33, which open into a space 38 within the coupling member 12, and the latter is formed with apertures 39 which also communicate with space 38. Furthermore the shaft 17 is formed with apertures 40 close to the splines through which it is in engagement with the shaft 18.

The end portion of the further tubular member 21, which fits within the end portion 41 of the tubular member 20, is formed with a flange 42 to abut the end face of the end portion 41 so that the end face 43 of the cylindrical part of the tubular member 21 which co-operates with the cup-shaped portion 41 is spaced from the axially-facing surface 44 on the tubular member 20. The tubular member 21 is also formed with a radial flange 45 substantially mid-way between the end face 43 and the surface 44 and this flange has a clearance from the bore of the end portion 41. Moreover, three equally-spaced slots 46 are formed in the periphery of the tubular member 21 between the flange 45 and the cylindrical part and the slots 46 lie at a lesser diameter from the axis of rotation than does the periphery of the flange 45. The periphery of flange 45 is also of greater diameter than the bore of the waist portion of the tubular member 20.

The second cup-shaped member 22 is also formed with a central aperture which has a substantially semi-circular groove 47 around its periphery and the groove is closed by an eyelet member 48, but in this case the eyelet member has a closed end, and thus blocks the central aperture. Drillings 49, 50 are formed at opposite ends of the groove 47, opening one to each side of the cup-shaped member 22. The drilling 50 opens to within the chamber 51 formed by the tubular member 21, and is arranged to be at a radius from the axis of rotation substantially equal to the radius of the bore of the tubular member, and the drilling 49 opens to within the sleeve 23. The member 22 is similar, in respect of the grooves and drillings, to member 19.

The sleeve 23 is made in three parts, a first end ring 52 which co-operates with the cup-shaped member 22, an elongated thin-walled tube 53 which is spigoted in the end ring 52, and an elongated tubular end portion 54 into which the other end of the tube 53 spigots. The tube 53 is formed with a pair of apertures 55 which are surrounded by inwardly-turned flanges. The tubular end portion 54 is formed with four axial grooves 56, 57, 58, 59 running lengthwise of its bore and is also formed with a circumferential groove 60 spaced at a short distance from the end where the tube 53 spigots into it, and communicating with the axial grooves 56, 57, 58, 59.

The turbine discs 13, 14 are provided at their central planes with small inwardly-directed ribs 61, 62, and the end portion 54 of the sleeve 23 is formed with three drillings 63, 64, 65 the drilling 63 being from the groove 56 and just upstream of the rib 61, the drilling 64 being from the groove 59 and just downstream of the rib 61, and the drilling 65 being from the groove 58 and just upstream of the inwardly-directed rib 62. The end part 54 terminates just on the downstream side of the rib 62 within the bore of the disc 14 and the fourth groove 57 continues to the end of the part 54.

The high-pressure turbine disc 13 is formed with an upstream extension 66 which has a radial flange 67 abutting a similar flange 68 on the end of shaft 11, and the extension 66 has radial drillings 69. The turbine discs 13, 14 are secured to one another and to a flange 70 on the end of the shaft 11 and by means of bolts 71 passing through the discs, the discs being formed with local bosses where the bolts pass through them. Thus bosses 72 on the upstream side of the high-pressure disc abut the flange 70, bosses 73 on the downstream side of the high-pressure discs 13 abut bosses 74 on the upstream side of the low-pressure disc 14, and bosses 75 on the downstream side of the low-pressure disc serve as an abutment for the nuts 76 which co-operate with the bolts 71.

The shaft arrangement functions in the following manner. During normal running of the gas-turbine engine the mist of air and oil is fed to within shaft 17.

A first part of the mist passes through holes 40 and between the shaft 17 and the shaft 10 and out through holes 39 in the coupling member 12 to pass over adjacent structure to cool it. In addition the oil serves to lubricate, for example, the splines between shafts 17 and 18, and those between shaft 10 and coupling 12. This part of the mist eventually passes to a breather incorporating a centrifugal air/oil separator.

A second part of the air/oil mist passes through the eyelet 30 in the cup-shaped member 19 into a first chamber 35 formed by the tubular member 20. Owing to the rotation of the shaft, there is a tendency for the oil, which is heavier than the air, to move radially away from the axis of rotation, and accordingly the oil tends to collect on the wall of the bore of the tubular member 20. The air, on the other hand, collects in the centre of the chamber and escapes through the holes 34 and the transverse tubular member 33 into the space 36, whence it passes through holes 37 into the space 38 where it rejoins the flow of the first part of the mist and passes out through holes 39.

The oil within the bore of tubular member 20 tends to fill up the pocket between the end face 43 of the member 21 and the axially-facing surface 44, and the flange 45 runs in this pocket of oil and thus forms a seal to prevent any flow of air or oil into a second chamber 51 within the tubular member 21. The radial depth of oil in the first chamber 35 is regulated by the passage 29 and holes 31, 32. If the radial depth of oil increases beyond the radius of the edge of the hole 32 (indicated by trace 77), the oil flows into the passage 29 and thus escapes through the hole 31 to within the shaft 17; thence it may pass through the gap between the end of shaft 17 and the cup-shaped member 19 and lubricate the splines interconnecting shafts 17 and 18.

When the shaft stops rotating the annulus of oil 77 within the chamber 35 collapses and forms a segment-shaped pool of oil (indicated by trace 78) in the lower part of the tubular member 20. This oil passes through the lower slots 46 in the tubular member 21 into the second chamber 51, but cannot pass out into the sleeve 23 owing to the construction of the cup-shaped member 22. In whatever position the shaft stops, at least one of the drillings 49, 50 will be above the oil level 78. Thus a quantity of oil determined by the dimensions of the tubular members 20 and 21 and by the radius of the bore of the eyelet 30 which is less than the radius of the bore of the tubular member 20 defining chamber 35, is trapped within the chamber 51.

When the engine next starts to rotate, part of the oil in the chambers 35, 51 within members 20 and 21 is forced into the pocket to co-operate with flange 45 and form a seal, and the majority of the oil within the chamber 51 is caused to form an annulus within the chamber owing to centrifugal effect, and thus passes through drilling 50 into passage 47 and out through drilling 49 into sleeve 23.

The oil passes axially along sleeve 23 and arrives in the circumferential groove 60 in the tubular end portion 54 where it is distributed between the four axial grooves 56, 57, 58, 59. The oil passes along each of the grooves and through the respective drillings 63, 64, 65 and from the end of groove 57 onto the bores of the two turbine discs, 13, 14, whence it passes respectively forward and aft to pass up the front and rear faces of each of the discs.

Referring now to Figures 2, 2a, 2b and 2c there is shown a second embodiment of the invention, Figure 2 shows part of a layshaft of the reduction gear of a gas-turbine engine, the layshaft 101 having a gear member 102 splined thereto and secured thereon by a nut 103 and the layshaft being mounted in plain bearing 104, 105 carried by stationary structure. It is desired to supply lubricant to the plain bearings 104, 105 immediately after the layshaft starts to rotate.

For this purpose there is provided within the layshaft a first sleeve 106 having a flange 107 which is shrunk into the bore of the layshaft. The flange 107 has flats cut on it to provide apertures between the sleeves 106 and the layshaft 101, as seen in Figure 2a. The first sleeve 106 has an end wall 108 provided with an aperture which cooperates with a nozzle 109 formed as part of the stationary structure. Oil is supplied from the stationary structure to the layshaft through the nozzle 109.

At its other end the sleeve 106 has spigotted within it a second sleeve 111 and the sleeve 111 has a flange 112 which is in sealing engagement with a bore of the layshaft 101. The end of the sleeve 111 which co-operates with the sleeve 106 is formed with a first portion 113 which spigots within the end of the sleeve 106, a transverse wall portion 114, and a second cylindrical portion 115 of smaller diameter than the portion 113. (See Figure 2b). The portion 115 is formed with drillings 116 which open into the chamber 117 within sleeve 106. There is also formed a flange 118 on the cylindrical portion 115 at about its mid-length, and the flange 118 is in sealing engagement with the bore of sleeve 106. Between the flange 118 and the transverse wall portion 114 there are formed a pair of radial walls 119, which also engage with the bore of sleeve 106, and thus define two passages 120 between the cylindrical portion 115 and the sleeve 106. The sleeve portion 106 is formed with radial drillings 121 at substantially opposite ends of a diameter opening into one end of each of the passages 120, and the wall 114 is formed with substantially axial drillings 122 which are angularly spaced from the radial drillings 121 through somewhat less than 180° and open into the diametrically opposite ends of the respective passages 120. The drillings 121 communicate with the space 123 between the sleeve portion 106 and the layshaft 101, and the drillings 122 communicate with the chamber 124 within sleeve 111.

The space 123 communicates, past flange 107, with the working surface of plain bearing 104.

A similar construction is employed at the other end of the sleeve 111 and in this case the sleeve 111 has spigotted within it a part 126, which has a flange 127 against which the end of sleeve 111 abuts axially and which has sealing engagement in the bore of a flanged cylindrical member 128. This member 128 is in sealing engagement within an enlarged-diameter part of the layshaft 101 and is retained against axial movement by having its flange 129 located between an axial face within the bore of the layshaft and a circlip 130 in a groove in the layshaft bore.

The end of the part 126 which co-operates with the sleeve 111 has a first portion 131 which spigots within the end of the sleeve 111, a transverse wall portion 132, and a second cylindrical portion 133 of smaller diameter than the portion 131 (see Figure 2c). The second cylindrical portion has a bore 134 which places the chamber 124 in communication with a chamber 135 within the part 126, the end of chamber 135 being closed by end wall 136 of cylindrical member 128. There is also formed a flange 137 on the cylindrical portion 133 at its end remote from transverse wall portion 132, and the flange 137 is in sealing engagement within the end of sleeve 111. Between the flange 137 and the transverse wall portion 132 there are formed a pair of radial walls 138, which also engage with the bore of sleeve 111, and thus define two passages 139 between the cylindrical portion 133 and the sleeve 111. The sleeve portion 111 is formed with radial drillings 140 at substantially opposite ends of a diameter opening into one end of each of the passages 139, and the wall 132 and flange 137 are formed with substantially axial drillings 141 which are angularly spaced from the radial drillings 140 through somewhat less than 180° and open into the diametrically opposite ends of the respective passages 139. The drillings 140 communicate with a space 142 between the sleeve portion 111 and the layshaft 101, and the drillings 141 communicate with chambers 124 and 135.

The space 142 communicates, through hole 143 in the layshaft, with the working surfaces of plain bearing 105.

In operation oil is injected into the chamber 117 through nozzle 109, and owing to centrifugal action the oil tends to form an annulus in chamber 117 against the wall of the bore of sleeve 106. The radial depth of the annulus is determined by the end wall 108. The oil passes through holes 116, which are at a greater radius than the lip of wall 108, into chamber 124, and also passes through holes 141 into chamber 135.

The inward flow of oil through holes 116 ensures that any sludge is deposited in chamber 117, owing to centrifugal action. The bearings 104, 105 are fed from chambers 124, 135, in the following manner. When the engine is running both the holes 122 and the four holes 141 are immersed in oil, which flows through them into the passages 120, 139 respectively. Here again the oil tends to form an annulus against the bores of the sleeves 106, 111 respectively, and is delivered through radial drillings 121, 140, the oil from drillings 121 passing along the bore of the layshaft 101, past the flange 107 by virtue of the flat cut on it, to the end of the layshaft 101, where it passes round the end of the layshaft to lubricate the surface of bearing 104. The oil from drillings 140 is received on the bore of the layshaft 101 whence it passes through holes 143 onto the surface of bearing 105.

When the engine stops rotating the oil occupies the lower segment of the chambers 117, 124, 135, the static level being determined by the height of the flange 108. Under these circumstances only one of the holes opening into each passage 120, 139 can be below the level of the oil, the other which is substantially at the opposite end of a diameter being above the level. Thus for example in the position shown in Figures 2b and 2c the axial holes 122, 141 of the left-hand passages 120, 139 will be below the oil level and the corresponding holes 121, 140 above the level, and the axial holes 122, 141 of the right-hand passages 120, 139 will be above the oil level and the corresponding radial holes 121, 140 below the oil level. In one position both the holes of one passage will be just above the oil level.

Thus a volume of oil is trapped in chambers 124, 135 which is determined by the length of the chambers, and the height of flange 108 (or in certain cases by the position of the holes 121, 122, 140, 141).

When the engine starts rotating again the trapped oil takes up an annular formation owing to centrifugal effect, and thus both the holes 122 and all the four holes 141 are immersed, and the trapped oil flows through the passages 120, 139, and out of the holes 121, 140 to the surfaces of bearings 104, 105. It will thus be appreciated that a predetermined volume of lubricant is fed to the bearings 104, 105 immediately the engine starts to rotate.

We claim:

1. In rotating machinery, means for supplying lubricant to parts requiring lubrication which means comprises rotating structure having a tubular wall defining an internal bore through which the lubricant passes and axially-spaced internal transverse walls co-operating with the tubular wall to define a chamber in which oil is trapped, oil-inlet defining means having an oil inlet opening into said chamber coaxially with the rotating structure, and oil outlet defining means including a passage, said passage having an inlet thereto opening into the chamber and an outlet therefrom in communication with the part to be lubricated, said inlet and outlet of the passage being on opposite sides of the rotational axis of the rotating structure and being at a radial distance from the axis greater than the oil inlet.

2. Means for supplying lubricant according to claim 1, wherein said passage of the oil outlet defining means has an outer wall portion which extends circumferentially of the rotational axis and the inlet and the outlet of said passage are at diametrically opposite positions in the passage.

3. Means for supplying lubricant according to claim 2, wherein said passage is semi-circular, the inlet being at one end of the passage and the outlet being at the opposite end of the passage, and the inlet and outlet of the passage being adjacent the tubular wall.

4. Means for supplying lubricant according to claim 1 wherein the oil outlet defining means comprises a first member having a central bore, a semi-circular groove extending around said central bore and opening to the bore, and a second member blocking the bore and closing the semi-circular groove to form said passage, the inlet and outlet being formed by drillings in the first member opening into the groove at its ends.

5. Means for supplying lubricant according to claim 2, wherein said oil outlet defining means comprises a pair of such passages in parallel, the inlet of each passage being located circumferentially adjacent the outlet of the other passage.

6. Means for supplying lubricant according to claim 1, wherein said oil outlet defining means further includes a second passage with an inlet thereto opening into the chamber and an outlet therefrom in communication with the part to be lubricated, the inlet and outlet of the second passage being on opposite sides of the rotational axis and being at a radial distance from the axis greater than the oil inlet, said oil inlet defining means comprising first and second cylindrical portions with axially-spaced radial walls extending between them to define an annular space, and further radial walls dividing said space to form said passages, diametrically-opposite axial drillings in said axially-spaced radial walls affording said inlets to the passages, and diametrically-opposite drillings opening to the annular space and affording the outlets from the passages, each further drilling being adjacent a corresponding one of the axial drillings and separated from it by said further radial walls.

7. Means for supplying lubricant according to claim 1, comprising seal means between the ends of said chamber dividing said chamber into first and second spaces respectively communicating with the oil inlet and with the inlet to said passage, said seal means preventing flow of oil between said spaces during rotation and permitting flow of oil into the second space, while the rotating structure is stationary.

8. Means for supplying lubricant according to claim 7, wherein the first space has a peripheral wall having a first portion of a first radius from the axis of rotation and a second portion adjacent the second space of a second radius greater than the first radius, and the seal means comprises a seal member which is coaxial with the tubular structure and has a radial flange projecting in the first space axially level with the second portion of the peripheral wall, said flange having a radius at its periphery between said first and second radii, and which seal member also has peripheral aperturing in it, on the side of the flange adjacent the second space, said aperturing being at a radius less than the first radius and opening into the first and second spaces.

9. Means for supplying lubricant according to claim 8 comprising means controlling the radial depth of the oil annulus formed on the first portion of the wall of the first space during rotation.

10. Means for supplying lubricant according to claim 9, wherein the oil depth controlling means comprises a second passage, an oil inlet to the second passage opening into the first space at a selected radial distance from the first portion of the peripheral wall and an outlet from the second passage externally of the chamber, the inlet and outlet of the second passage being on opposite sides of the rotational axis.

11. Means for supplying lubricant according to claim 7, comprising also centrifugal separator means in said first space of the chamber having an air outlet from said chamber, whereby air/oil mist may be fed to the chamber, the oil being separated from the air and retained in the chamber and the separated air flowing from said outlet.

12. Means for supplying lubricant according to claim 11, wherein the centrifugal separator means comprises at least one tube extending transversely across the chamber and having an inlet thereto on the axis of rotation and an outlet externally of the chamber.

13. Means for supplying lubricant according to claim 7, comprising delivery means communicating with the outlet of said passage of the outlet-defining means, the delivery means including a sleeve coaxial and rotating with the tubular wall, the outlet opening into the sleeve, a circumferentially-extending groove internally of the sleeve to collect oil delivered into the sleeve, and at least one internal axially-extending groove formed internally of the sleeve and intersecting the circumferential groove to be fed with oil collected therein, and outlets from the axial groove to externally of the sleeve.

14. Means for supplying lubricant according to claim 13 comprising a plurality of internal axially extending grooves, the outlets of the grooves being at differing axial locations along the sleeve.

15. In combination a multi-stage turbine having a plurality of turbine discs with central bores and a hollow driving shaft connected to the discs, and means for supplying lubricant according to claim 14, the means being located within the shaft and the sleeve projecting into said central bores of the discs, the outlets from the axial grooves in the sleeve each delivering oil to a different surface of the discs.

16. The subject matter of claim 15, wherein each disc has a radially-inwardly extending circumferential land in its central bore and the outlets of two of said axial grooves open into the bore, one of each side of the land.

17. Means for supplying lubricant according to claim 1, wherein said oil inlet is a nozzle provided centrally in one of said transverse walls and the other transverse wall closes the adjacent end of the chamber, and wherein there are provided a plurality of such oil outlet defining means at axially spaced positions between the end walls, the outlets from the respective passages being in the tubular wall.

References Cited in the file of this patent

UNITED STATES PATENTS

| | | |
|---|---|---|
| 1,176,936 | Waldon | Mar. 28, 1916 |
| 2,212,223 | Barnes | Aug. 20, 1940 |
| 2,253,416 | Caldwell | Aug. 19, 1941 |
| 2,754,814 | Hopwood | July 17, 1956 |